(No Model.)
H. CURTIS.
GRAIN ADJUSTING DEVICE.
No. 336,553. Patented Feb. 23, 1886.
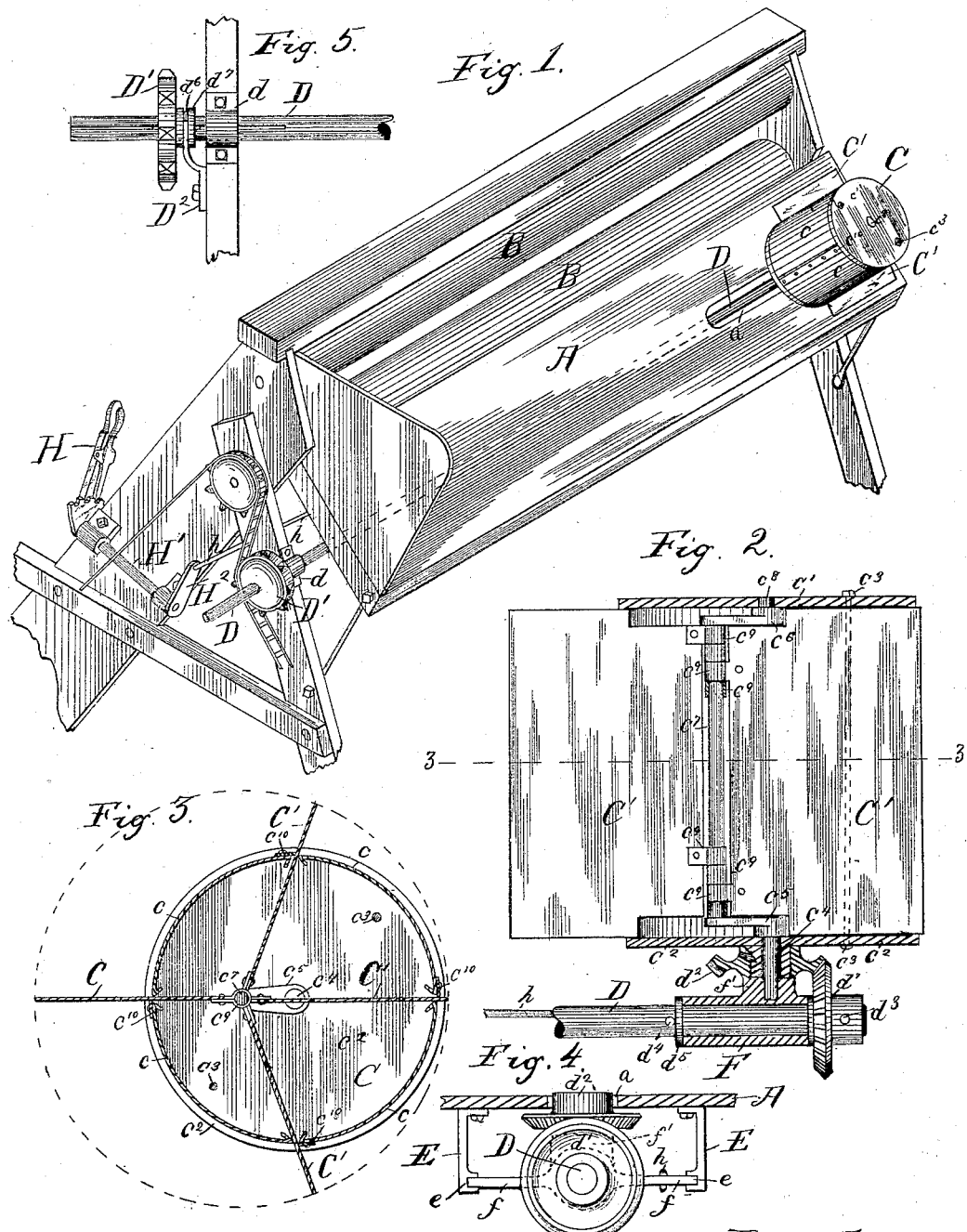
Witnesses:
Lew. E. Curtis.
C. C. Linthicum.
Inventor:
Henry Curtis:
By Taylor E. Brown
his Attorney

UNITED STATES PATENT OFFICE.

HENRY CURTIS, OF CHICAGO, ILLINOIS.

GRAIN-ADJUSTING DEVICE.

SPECIFICATION forming part of Letters Patent No. 336,553, dated February 23, 1886.

Application filed February 18, 1885. Serial No. 156,312. (No model.)

*To all whom it may concern:*

Be it known that I, HENRY CURTIS, a citizen of the United States, residing in Chicago, in the county of Cook and State of Illinois, have invented certain new and useful Improvements in Grain-Adjusting Devices, of which the following is a specification.

The object of this invention is primarily to produce a butter or grain adjusting device adapted to be placed at the front end of the receiving table or platform of a grain harvester and binder in order to adjust the ends as it carries the grain away from the elevating-rollers and down to the packers or binding mechanism; and, secondly, to provide means for operating a butter from the rear end of the machine, and also to produce a more simple and effective yet cheaper device than those now in use.

In the machines now in use where an endless canvas belt is used as a butter great difficulty has been experienced from the slipping or sliding of the canvas on the rollers on which it is mounted by reason of the pressure of the grain on it, particularly when long grain is handled, thus failing to accomplish its object and choking the machine, and the canvas wears out very quickly. When no butting-board or adjuster is used, the binder is shifted by the operator, so as to accommodate grain of different lengths. This tends to unbalance the machine and causes strain on the parts; also, where no butter is used the ends of the grain coming onto the receiving table or platform frequently catch onto and are held by the front wind-board, thus allowing the head or grain ends to fall down, frequently missing the binding mechanism and not bound at all, or, if bound, the bundle is uneven or ragged. The grain must be moved lengthwise and the butts adjusted before the grain is allowed to pass down into the packers or binding mechanism, and should the butt-end of the grain be caught or held momentarily the head or grain end will fall down into the packers and prevent the canvas adjusters or butting-board from working successfully. In order, if possible, to overcome this difficulty the canvas belts and the butting-boards have been mounted on the receiving table or platform forward or outside of the ends of the elevating-rollers, and generally having that portion rigidly secured to the platform which is nearest the rollers. This necessitates placing the operating mechanism in front and causes additional expense.

My invention is designed to overcome the evils above mentioned, and will be more fully understood by reference to the accompanying drawings, wherein I have shown, in—

Figure 1, in a perspective view, my new butter or adjusting device as applied to a receiving-platform of a grain-harvester. Fig. 2 is a vertical longitudinal section of the butter, showing means for operating the same. Fig. 3 is a horizontal section through the butter, taken on line 3 3 of Fig. 2. Fig. 4 is an end view showing the slide on which the operating-shaft is mounted, and Fig. 5 is a detail view of the driving mechanism.

Similar letters of reference indicate like parts throughout the drawings.

In the drawings, A represents the receiving-table or binding-platform of a grain harvester and binder; B B, the elevating-rollers. C is the butter, and D the shaft for operating the same. The shaft D is mounted on the frame of the machine beneath the receiving table or platform, and about parallel with the elevating-rollers B B. From the front end of the table A are secured the depending brackets E, having guideways $e$. The end of the shaft D is mounted in a sleeve or bearing, F, which sleeve has laterally-projecting flanges $f\,f$, which fit in the guideways $e$, so as to slide therein. These guideways $e$ extend lengthwise under the table A a sufficient distance to permit the longitudinal movement of the shaft D, to be hereinafter described. The rear end of the shaft is journaled in an ordinary bearing, $d$, so as to permit a lateral movement of the shaft. The shaft may be operated from the elevating-rollers by placing a gear-wheel on the end of the shaft, which will mesh with the driving-gears of said rollers; but I much prefer to use the sprocket-wheel D', (shown in the drawings,) which sprocket-wheel is feathered on the shaft D, so as to mesh with the sprocket or driving chain of the harvester.

The butter C consists, essentially, of a drum composed of thin staves $c$, secured between the heads $c'\ c^2$ by the bolts $c^3$.

Rigidly secured in a hub, $f'$, on the bearing F, and projecting upward through the head $c^2$ of the drum, is the pin or stud $c^4$, having at its upper end the crank $c^5$. A similar crank, $c^6$, is placed in the drum immediately beneath the head $c'$, and is connected with the crank $c^5$ by the shaft $c^7$. The drum is revolved on the crank-pins $c^4$ and $c^8$ as a center from the shaft D by the miter-gears $d'$ $d^2$, the latter being rigidly secured to the hub on the head $c^2$ of the drum. Pivoted to the shaft $c^7$ by the straps or hinges $c^9$ are the wings or leaves $c'$, which project beyond the periphery of the drum between the staves $c$. Scrapers $c^{10}$ are secured to the staves $c$, to prevent the grain from entering the drum in the opening between the staves. The butter is adjusted by means of the lever H, shaft H', and crank $H^2$, operating the rod $h$, which rod $h$ is secured to the flange $b$ of the bearing F. A slot or opening, $a$, in the platform or table permits the longitudinal movement of the butter. The miter-wheel $d'$ is rigidly secured to the shaft D by the pin $d^3$, and the bearing F is secured lengthwise in position on the shaft, so as to allow the shaft to turn therein by means of the pin $d^4$ and the washer $d^5$. The sprocket-wheel D' is prevented from following the shaft D, when the latter is moved toward the rear end of the machine by means of the fork $D^2$, secured to the frame, fitting in the annular groove $d^6$ in the hub $d^7$ of the sprocket-wheel D'.

When the machine is in operation, the drum is revolved while the shaft $c^7$ remains stationary, thus causing the wings or leaves $c'$ to protrude from and recede into the drum as it revolves, the outside edges of the wings or leaves describing the circle indicated by the dotted lines in Fig. 3 about the shaft $c^7$ as a center. When the grain comes from the elevating-rollers onto the table, the end of the grain will fall onto the butter at some portion of its periphery, and as the butter revolves the wings or leaves engage the ends of the grain and crowd it backward and downward, never carrying the butt-end of the grain farther to the rear than the rearmost portion of the drum, thus bringing all of the butts together.

When short grain is being harvested, the operator moves the butter to the rear toward the binding mechanism as far as is necessary by means of the lever H, the shaft D sliding through the bearing $d$ and the sprocket-wheel D'. The wings or leaves are cut away, as shown, so as to pass or clear the stationary cranks as the drum revolves. I have shown the butter as being operated from the driving chain of the machine, as I deem this the simplest and most economical construction, but it is obvious that my butter or grain adjusting device may be operated in other ways from either end of the machine, by gears or other suitable means.

I have shown four wings of leaves in my butter, but I do not wish to limit myself to number, as a greater or less number may be used if desired.

Having now described my invention, what I claim, and desire to secure by Letters Patent, is—

1. The grain-adjusting devices or butter, consisting of a rotary drum provided internally with wings or leaves, and means, substantially as described, to automatically project and withdraw said wings through openings in said drum as the drum revolves, substantially as described.

2. The grain-adjusting device consisting of a rotary drum provided with wings projected and withdrawn automatically through the periphery of the drum, and mechanism, substantially as described, for operating the same, as set forth.

3. The drum C, consisting of staves $c$ and heads $c'$ $c^2$, said staves being provided with scrapers $c^{10}$, in combination with the automatically-operating wings or leaves $c'$, substantially as specified.

4. The butter C, mounted on the journal fixed in the bearing F, and projected through a slot in the table A, in combination with the longitudinally-movable operating-shaft D, supported in said bearing F, and driving-gear D', substantially as specified.

5. The butter C, revolving upon the stationary journals $c^4$ $c^8$, formed on the cranked shaft $c^5$ $c^6$ $c^7$, in combination with the wings $c'$, pivoted on the shaft $c^7$, whereby by the rotation of the drum upon its axis the wings describe a circle about the shaft $c^7$ as a center, substantially as and for the purpose specified.

6. The bearing F, secured on the shaft D by the pins $d^3$ $d^4$, and provided with flanges $f\,f$, and a hub or bearing, $f'$, substantially as specified.

7. The operating-shaft D, adjustably mounted on the frame of a grain-harvester, in combination with the butter supported on the end of said shaft, and mechanism, substantially as described, for shifting said shaft and butter as desired, substantially as specified.

HENRY CURTIS.

Witnesses:
 TAYLOR E. BROWN,
 LEW. E. CURTIS.